Jan. 13, 1948. J. M. ROTH 2,434,589
PUMP SHAFT SEAL
Filed Oct. 16, 1944
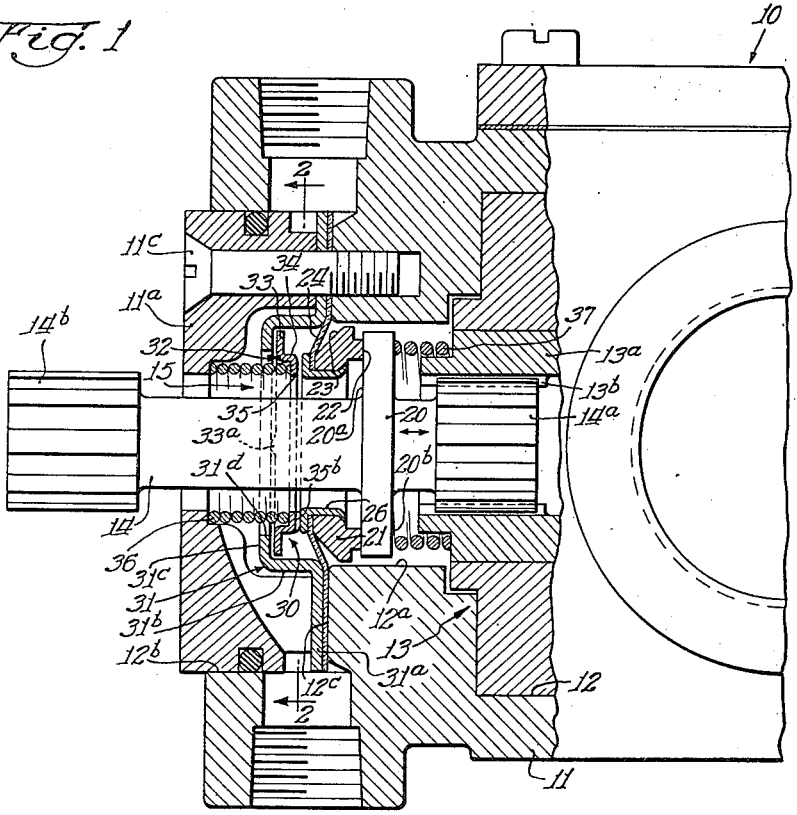
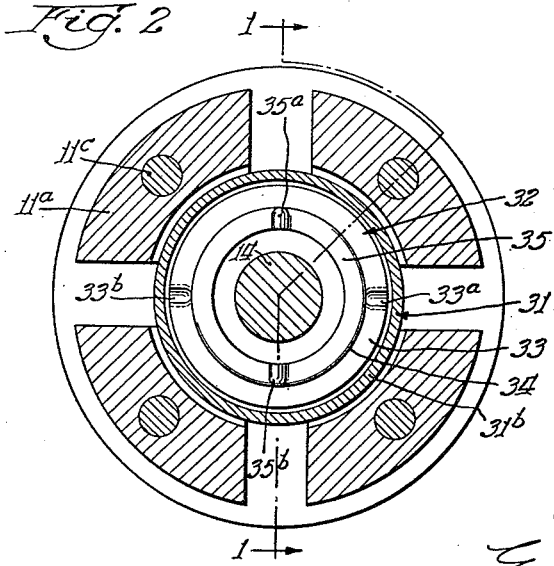
Inventor:
Jay M. Roth Patented Jan. 13, 1948

2,434,589

UNITED STATES PATENT OFFICE 2,434,589

PUMP SHAFT SEAL

Jay M. Roth, Euclid, Ohio, assignor, by mesne assignments, to Borg-Warner Corporation, Chicago, Ill., a corporation of Illinois Application October 16, 1944, Serial No. 558,840

3 Claims. (Cl. 286—11)

This invention relates to rotary shaft seals and particularly to a seal arrangement of this type adapted for a fluid pump drive shaft coupling wherein due to the peculiar character of such pump provision must be made for both a limited amount of axial movement of the shaft as well as for a limited variation in the position of the axis of rotation of the drive shaft coupling.

It is an object of this invention to provide a rotary shaft seal of the present character which is both economical to manufacture and efficient in operation and maintenance.

It is a more particular object of the present invention to provide in a rotary shaft seal of the present type a universal joint-like action providing for limited variation in the position of the axis of rotation of the coupling shaft. It is a still further detailed object to provide in such a coupling an additional arrangement of means effective to maintain the sealed relation while the coupling shaft is being moved axially within limits.

Other and more particular objects, advantages and uses of my invention will become apparent from a reading of the following specification taken in connection with the accompanying drawing which forms a part thereof and wherein:

Fig. 1 is a broken-away axial section view of a rotary fluid pump incorporating one preferred embodiment of my invention, this view being taken substantially on the line 1—1 of Fig. 2;

Fig. 2 is a cross-sectional view taken substantially on the line 2—2 of Fig. 1.

Referring in greater detail to the figures of the drawing a rotary fluid pump of the reciprocating vaned type is indicated generally at 10 and includes essentially a housing 11 formed internally with a pump bore 12 containing a rotary pumping assembly 13 adapted to be driven by an external power source through a coupling shaft 14 protruding from the housing and requiring a rotary bearing and seal assembly indicated generally at 15.

It is to the particular arrangement and mode of operation of this rotary bearing and seal assembly 15 that this invention is directed.

Bearing and seal assembly 15 preferably includes a flange 20 extending radially from coupling shaft 14 and disposed intermediate the terminals thereof within a reduced bore 12a of housing 11. Radial flange 20 includes an outwardly facing radially extending bearing and seal surface 20a and an inwardly facing radially extending surface 20b.

Engaging radially extending surface 20a in bearing and sealed relation is a non-rotating bearing and seal ring 21 in turn having a radially extending bearing and seal surface 22. In addition bearing or seal ring 21 is provided with the outwardly facing generally radially extending inclined surface 23, performing an important function in connection with maintaining surface 22 in sealed engagement with surface 20a as will appear. Flexible seal and supporting diaphragm 24 is provided with an axial opening therethrough embracing shaft 14 in radially spaced relation thereto and has its radial inner portion sealably fastened to bearing and seal ring 21 through the medium of confining shell 26 which may be spun into attaching relationship.

Particular attention is directed to the universal joint-like rocker assembly indicated generally at 30 and functioning in combination with bearing and seal ring 21 to compensate for variations in the position of the axis of rotation of coupling shaft 14. Universal rocker assembly 30 preferably includes end thrust ring 31 functioning to support rocker reaction ring 32. End thrust rocker supporting ring 31 preferably includes radially outwardly extending attaching portion 31a, intermediate axially outwardly extending portion 31b and radially inwardly extending rocker supporting portion 31c terminating in an axial orifice 31d embracing shaft 14 in radially spaced relation thereto. End thrust rocker supporting ring 31 may be readily provided from sheet metal by a simple stamping operation.

Rocker reaction ring 32 preferably includes a radially outwardly extending flange 33 formed with a pair of diametrically opposed rocker protuberances 33a and 33b normally contacting the inner supporting surface of rocker supporting ring 31. An axially inwardly extending portion 34 joins with a radially inwardly extending flange portion 35 to provide a cup-like seat for a coil compression spring as will appear. Radially inwardly extending flange 35 is provided with an additional pair of diametrically opposed rocker protuberances 35a and 35b engaging seal and bearing ring assembly 21, actual contact being between protuberances 35a, 35b and attaching shell 26. Rocker protuberances 33a, 33b and rocker protuberances 35a, 35b are disposed on diameters removed arcuately 90° apart. It will now appear that this rocker arrangement provides for limited free rocking movement of bearing and seal ring 21 to compensate for or provide for limited variations in the position of the axis of rotation of coupling shaft 14.

The radial outward portion 31a of rocker supporting ring 31 and the radial outer portion of diaphragm 24 are held in sealed attached relationship to housing 11 by means of closure plug 11a received in bore 12b of somewhat larger diameter than flange receiving bore 12a, thus providing a shoulder 12c against which the diaphragm and the rocker supporting rings are held. Closure member 11a may be held in position by means of cap screws 11c and the same is formed with an axial opening through which shaft 14 may extend in radial spaced relation.

It will be noted that the outwardly facing surface 23 of bearing and seal ring 21 extends radially inwardly of the radial outer extremity of bearing and seal surface 22 by an amount which is selected to determine the pressure loading of ring 21. When the pump is operating and delivering pressure fluid, the same will gain access to radial flange 20, surface 23 and ring 21. With the rocker ring 32 in engagement with the rocker supporting ring 31 the reaction of the fluid acting on diaphragm 24 is taken by supporting ring 31 and an axial force is applied to bearing and seal ring 21 in the sealing direction which depends on the amount of radial overlap between surfaces 23 and 22.

To still further improve the operating characteristics there is provided a first relatively weaker coil compression spring 36 having the inner terminal thereof in engagement with rocker ring 32 and the outer terminal thereof in engagement with the housing closure plug 11a for applying an axial force to rocker ring 32 tending to cause the same to separate from supporting ring 31 and follow any axial movement of bearing and seal ring 21. A second relatively stronger coil compression spring 37 has one terminal in engagement with face 20b of radial flange 20 and the other terminal in engagement with rotor 13a of pump assembly 13. Rotor 13a is formed internally with splines 13b for cooperation with splines 14a formed on the inner terminal portion of coupling shaft 14. These splines provide the necessary driving relationship between pumping shaft 14 and rotor 13a while allowing for axial relative movement. The outer terminal of shaft 14 is similarly provided with splines 14b for connection with a source of power.

It has been found that in the normal installation and operation of pump 10 there often occurs a condition such as a burr on spline 14b or on the splines being connected thereto with the result that shaft 14 has an axial force applied thereto in the inward direction. In the absence of special provision this would result in a separation of sealed contacts between surfaces 22 and 20a of the bearing seal. With the present arrangement the result is a limited compression of relatively stronger spring 37 by the inward movement of radial flange 20 thus rendering the relatively weaker spring 36 effective to cause bearing and seal ring 21 to follow radial flange 20 and maintain sealed contact.

It will be understood that the precise structure shown and described may be varied within the limit of equivalents, particularly as regards applicant's broader claims. For example, while I prefer the particular arrangement of structure comprising rocker supporting ring 31, because of the novel advantages the same affords with reference to installation, adjustments, and maintenance, I nevertheless contemplate as coming within the broader scope of my invention the formation of a supporting shoulder for rocker ring 32 directly on closure member 11a.

While I have shown and described certain specific structure as comprising the preferred embodiment of my invention it is to be understood that this is by way of example and that my invention is to be defined by the appended claims.

I claim:

1. In a fluid seal for a rotary shaft having a radially extending flange intermediate the terminals thereof; a diaphragm supported seal and bearing ring, said ring having a radially extending bearing surface engaging said flange; means defining a universal joint-like assembly normally engageable by said seal and bearing ring on the axially opposite side thereof from said flange, said universal joint-like assembly being effective to provide for limited variations in the position of the axis of said shaft; resilient means biasing said flange against said sealing ring; and relatively weaker resilient means biasing said sealing ring toward said flange from the opposite direction whereby the shaft may have limited axial movement in a direction toward the first resilient means while maintaining sealed bearing contact between said flange and sealing ring.

2. In a fluid seal for a rotary shaft extending through the wall of a housing, the shaft having a radially extending flange disposed within said housing; a flexible diaphragm sealably attached to said housing about the radial outer portion thereof and axially perforated for embracing relation about said shaft, a seal and bearing ring carried by the radial inner portion of said diaphragm and disposed adjacent the axial outer radial surface of said flange, said ring having a radially extending bearing and seal surface engageable with said flange; a rocker reaction ring embracing said shaft in radially spaced relation thereto outwardly of said bearing and seal ring, means for fastening the radial outer portion of said reaction ring to said housing; and end thrust rocker ring having a first pair of diametrically opposed protuberances extending axially in the direction of said rocker reaction ring and normally engaging the same, a second pair of diametrically opposed protuberances extending axially in the opposite direction from said first pair of protuberances and disposed on a diameter removed arcuately 90° from said first pair of protuberances, said second pair of protuberances engaging said seal ring; a first relatively weaker coil compression spring embracing said shaft having one terminal in engagement with said housing and the other terminal in engagement with said end thrust rocker ring; and a second relatively stronger coil compression spring having one terminal in engagement with said radially extending flange on the inner side thereof opposite said bearing and seal ring and the other terminal thereof in engagement with said housing, whereby said bearing and seal ring is given limited adjustability about said universal joint-like protuberances to compensate for variations in the position of the axis of said shaft and whereby said shaft may have limited axial movement inwardly of said housing while maintaining sealed bearing contact between said bearing and seal ring and said radial flange.

3. In a fluid seal arrangement for a shaft which extends through an opening of a housing, said shaft having splined ends and a radially extending flange intermediate its splined ends, which splined ends are adapted to cooperate with a splined external driving member and a splined internal driven member; a flexible diaphragm within said housing having the radial outer portion thereof supported by said housing and having an axial orifice therethrough embracing said shaft intermediate the ends thereof adjacent one side of said flange, a bearing and seal ring carried by the radial inner portion of said diaphragm and having a radially extending seal and bearing surface engaging the axially outwardly facing radial surface of said flange, a rocker reaction ring having an axial orifice embracing said shaft in radial spaced relation thereto, means for fastening the radial outer portion of the reaction ring to said housing, an end thrust rocker ring having a first pair of diametrically opposed protuberances extending axially in the direction of said rocker reaction ring and normally engaging the same, a second pair of diametrically opposed protuberances extending axially in the opposite direction from said first pair of protuberances and positioned on a diameter removed arcuately from said first pair of protuberances by 90°, said second pair of protuberances engaging said seal ring, a first relatively weaker coil compression spring having one terminal thereof engaging the housing and the other terminal thereof engaging said rocker ring, a second relatively stronger coil compression spring acting upon said radial flange on the side opposite said bearing and seal ring, whereby to provide for limited variations in the position of the axis of said shaft by rocking about said protuberances and further providing for maintaining said seal and bearing rings in sealed contact with said radial flange upon limited axial movement, inwardly of said housing, of said shaft with respect to the driven member through their respective cooperating splines.

JAY M. ROTH.

REFERENCES CITED

The following references are of record in the file of this patent:

UNITED STATES PATENTS

| Number | Name | Date |
|---|---|---|
| 1,746,068 | Barnes | Feb. 4, 1930 |
| 1,953,383 | Albertson | April 3, 1934 |
| 2,281,157 | Kanuch et al. | Apr. 28, 1942 |
| 1,897,937 | Joyce | Feb. 14, 1933 |
| 2,223,070 | Kleckner | Nov. 26, 1940 |